(12) United States Patent
Eberhardt et al.

(10) Patent No.: US 8,377,538 B2
(45) Date of Patent: Feb. 19, 2013

(54) VACUUM INSULATION PANEL, AND METHOD FOR THE PRODUCTION THEREOF

(75) Inventors: Hans-Frieder Eberhardt, Giengen-Brinz (DE); Steffen Knoll, Kempten (DE); Ina Schreib, Dresden (DE)

(73) Assignee: Porextherm Daemmstoffe GmbH, Kempten (DE)

( * ) Notice: Subject to any disclaimer, the term of this patent is extended or adjusted under 35 U.S.C. 154(b) by 332 days.

(21) Appl. No.: 12/667,226

(22) PCT Filed: Jun. 26, 2008

(86) PCT No.: PCT/EP2008/005189
§ 371 (c)(1),
(2), (4) Date: May 18, 2010

(87) PCT Pub. No.: WO2009/003630
PCT Pub. Date: Jan. 8, 2009

(65) Prior Publication Data
US 2011/0129637 A1 Jun. 2, 2011

(30) Foreign Application Priority Data
Jun. 30, 2007 (DE) .......................... 10 2007 030 689

(51) Int. Cl.
*F16L 59/065* (2006.01)
(52) U.S. Cl. .......................................................... 428/69
(58) Field of Classification Search .................... 428/69
See application file for complete search history.

(56) References Cited

U.S. PATENT DOCUMENTS

2006/0076863 A1* 4/2006 Echigoya et al. .............. 312/401
2006/0263571 A1* 11/2006 Tsunetsugu et al. ............ 428/69

FOREIGN PATENT DOCUMENTS

DE 202006008477 U1 * 10/2006
DE 102005054012 A1 * 5/2007

* cited by examiner

*Primary Examiner* — Alexander Thomas
(74) *Attorney, Agent, or Firm* — Venable LLP; Stefan J. Kirchanski

(57) ABSTRACT

The invention relates to a vacuum insulation panel (10) comprising a support element (11) in a gas-tight jacket (20) which has at least two components (21, 22), especially film sections that are joined by means of spaced-apart sealing seams/flaps (25a, b). The sealing seams/flaps (25a, b) are positioned especially on a main surface (12) of the vacuum insulation panel (10). Also disclosed is a method for producing the vacuum insulation panel (10) according to the invention.

4 Claims, 2 Drawing Sheets

VACUUM INSULATION PANEL, AND METHOD FOR THE PRODUCTION THEREOF

Figure 1:
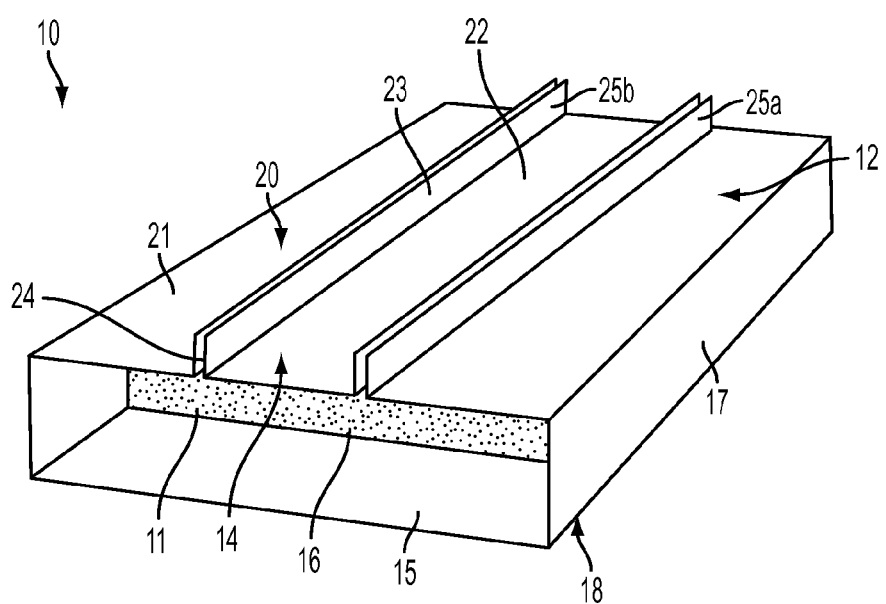

Vacuum insulation panels are used for thermal insulation of refrigerators and transport containers etc. Another use area for vacuum insulation panels is the building sector, whenever better thermal insulation values are required with a small thickness of the employed insulating materials. Vacuum insulation panels usually consist of a plate-shaped, pressure-stable core material, which is packed in a high-barrier gastight foil and evacuated to an internal pressure of approx. 5 mbar. The cores are cut before packing according to the specific requests of use or construction site. For insulation of larger surfaces several insulation panels are placed together in a flush manner.

For production of the vacuum insulation panels in a conventional way the panel cores are inserted into prefabricated bags and subsequently sealed and evacuated along the open side. The bags have three sealing edges as determined by way of their production. From this mode of production it results that the sealing flaps of the finished panel project from the faces in an angle of approx. 90°, such that they must be folded in a manual way after the wrapping and evacuating steps and finally fixed with adhesive tape.

Since the sealing seams are present at the faces flush arrangement of the vacuum insulation panels is difficult in view of insulation. Further, the joints represent cold bridges, which worsen the insulation values of the vacuum insulation panel significantly. In order to achieve planar contact edges at the panel, the flaps/sealing seams should be arranged to form a maximum number of planar surfaces at the panel.

DE 100 58 566 shows a vacuum insulation panel with a foil coated insulation body. This insulation body is wrapped with a single planar foil. At the interface between the beginning of the foil and its end the film is welded, such that the seam runs transversely to the wrapping direction of the core body. The sealing flap formed in such a way is folded to the core body. At the remaining open ends the foil is also folded and welded.

A disadvantage of this type of wrapping the insulation body is that taut pulling of the foil affects the sensitive, microporous insulation body, which often leads to breaking out these edges and causes a bad fitting of the finished vacuum insulation panel, for example in an assembly of vacuum insulation panels. By the use of foil sheets the wrapping apparatus must be additionally adjusted with each change of dimension of the insulation bodies, thus causing unproductive preparation times. In addition, a multiplicity of differently dimensioned foil sheets must be on store, thus causing higher logistic effort.

The object of the present invention is to provide a vacuum insulation panel, which overcomes the disadvantages specified above, being flexible in use for a multiplicity of inserts and having excellent insulation values as well as being simple and inexpensive in production of various dimensions.

The vacuum insulation panel according to invention has an insulation/support body in a gastight envelope, and is characterised in that the gastight envelope consists of at least two components, which are connected by spaced-apart sealing seams or flaps. The sealing seams/flaps are especially arranged at a main surface of the vacuum insulation panel. In particular, the components are portions of a gastight high barrier foil and have additional coatings, as for example metallization layers in order to improve the insulation characteristics of the vacuum insulation panel.

One component of the envelope is wrapped around the essentially parallelepiped panel core, which is pressed or made from microporous material, as for example precipitated silica, fumed silica, or aerogel, from open-celled polyurethane foam, open-celled polystyrene foam, open-celled polyisocyanate foam or fiber materials. Thus, an essentially strip-shaped range remains free. A corresponding second component of the envelope is inserted into this remaining free range, that depends on the dimension of the panel core and/or depending on the size of the first component, in order to realize a complete package of the panel core. The second component of the envelope is narrower than the panel width. Thus, it is possible to realize a tautly fitting envelope despite deviations in the dimensions of the panel core, which can occur for example due to manufacturing tolerances, and react in a flexible manner to different dimensions of the panel core. The components can be connected with one another via a sealing (adhesive) medium, located at the inside of the foil and/or welded.

In a preferred manner the projecting parts of the envelope components are folded inwardly towards the face of the vacuum insulation panel. The in-folded ranges can be subsequently sealed except of an opening. Then, the vacuum insulation panel is evacuated via this opening. After the evacuation the opening is finally sealed.

In a preferred embodiment of the invention the components are provided with a further "functional" coating in the range of the sealing seams. The coating improves the compound between the components and seals the seam, additionally. An example of a functional coating is an ORMOCER®—layer on the sealing or connecting ranges of the components in order to create an additional barrier layer at the sensitive seal seams. Another coating can be applied in the range the seams on the outside of the finished vacuum insulation panel, as well. For example, a contact adhesive can be sprayed to the vacuum insulation panels for planar assembly.

It is possible to manufacture the components of various materials and/or with different material thickness. In particular the second, narrower component, which covers the range released by the first component, is formed as a rail or provided with receiving members for a corresponding assembly. Thus, the vacuum insulation panels can be installed via this rail and/or the receiving members in a particularly simple and rapid way. For insulation of larger areas the vacuum insulation panels can be connected in a particularly simple manner. The second component is made from a material to be connected and/or welded with the first component or is provided with welding points in the range of the sealing seams to form a suitable sealing, adhesive and/or welding seam.

The invention method for formation of a vacuum insulation panel with a support body and a gastight envelope, in particular a foil casing having at least two components, in particular foil sections, includes several steps. First, the support or insulation body is wrapped with a component of the gastight envelope. Thus, a range narrower than a main surface of the support or insulation body is recessed. Subsequently, at least a second component of the gastight envelope is inserted into the recessed portion. It is more favourable in manufacturing to put first the second narrower component on the core and then to fold the first larger part thereto. The overlapping ranges of the components are subsequently connected to form a sealing seam each at the top and transverse sealing seams at the faces. After folding the respective transverse sealing seams to the vacuum insulation panel the gastight envelope will be evacuated. By the evacuation step the gastight envelope rests to the support or insulation body, such that the vacuum insulation panel according to the invention is finished.

The method also ensures by the direct enveloping of the core that foil add-ons for inserting of the panel core into the three-sided bag or tube are avoided and manufacturing tolerances are balanced. The tightly resting of the foil to the support or insulation body allows a close grouping of vacuum insulation panels in a way almost free of cold bridges, since the mating faces are planar because of the position of the sealing seams. The taut enveloping of the panel core minimizes formation of wrinkles with the evacuation. Thus, the invention method provides more exactly shaped vacuum insulation panels, since the foil add-on of three-sided bags are minimized.

The invention method allows the production of vacuum insulation panels of almost any size contrary to the use of prefabricated foil tubes or foil bags. Thus, an individual adapting of the size and form of the vacuum insulation panels is possible. For example, the width of the first component of the envelope can be held constant independent from the final dimension of the vacuum insulation panel. A completion of the envelope is then made via the second component, which is variable in its width and is tailored before the insertion into the recess released by the first component. Thus, preparation time and cost is involved only for adaptation of the width of the second component or section of the envelope or a change of material. Additionally, it is avoided that the sensitive barrier foil is drawn over a form shoulder, risking a damage of the barrier layers and an increase of the permeation characteristics as with the use of prefabricated bags.

It is preferred that the projecting part of the envelope is folded towards the faces of the support body in an additional process. By this folding technique, in particular together with the position of the sealing seams, the vacuum insulation panel has planar mating faces and shows convolutions only at the short faces. Thus, mating of the side edges of several vacuum insulation panels with almost no cold bridges is possible.

It is particularly favourable, that the seal flaps are folded and flatly fixed to the main surfaces of the support body. The fixation can be made for example via another welding or sticking of the seal flaps to the main surface of the vacuum insulation panel. It is also possible to fold the seal flaps in such a way to point to each other. Thus, a strengthened strip in the middle region of the vacuum insulation panel is obtained, which can be used to apply an adhesive, for example.

In a further favourable embodiment of the present method the components of the envelope are made from various materials or have different preformed material thickness. The second component can be formed, for example as a rail or strip, which runs in the main surface of the vacuum insulation panel and can be mounted to the vacuum insulation panel in a particularly simple way. This preformed second component can be inserted into the recess, remaining from the initially incomplete envelope of the vacuum insulation panel, and then welded, bonded or sealed with the overlapping ranges of the first component. After completed evacuation of the vacuum insulation panel the envelope and thus also the preformed second component tightly rests on the insulation or support body.

It is particularly favourable to clamp at least the first component in sealing bars to envelope the insulation or support body. For this partial enveloping the sealing bars guide the first component of the envelope around the insulation or support body up to the predetermined insertion position for the second component, defined by the dimension of the first component. After insertion of the second component the sealing bars initiate a welding or a sealing of the overlapping ranges of the components to form a sealing seam or seal flap. In a further step folding and fixing of the seal flaps towards the support body is performed by the sealing bars.

In a further preferred embodiment of the present invention the second section of the envelope is stretched over a forming chute and deformed to the support body by corresponding press punches in a further process step. The press punches can also act as backstops for sealing the components. The form chute is variable in its dimension to thus enable the insertion of the second component into the recess left by the first component of the envelope. Thus, this embodiment makes it possible to address to various dimensions and formations of the vacuum insulation panel. A corresponding design of the form chute provides for example rounded casing components or sections with free configurable shape and the corresponding vacuum insulation panels.

Figure 2:
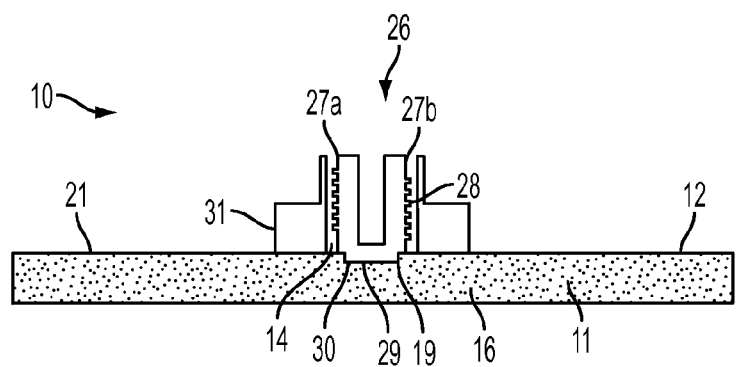

Further advantages and features of the invention may be gathered from the subsequent description of preferred, non-limiting embodiments of the invention on the basis of schematic drawings:

FIG. 1 shows a preferred embodiment of the vacuum insulation panel according to the invention before sealing in perspective view, and FIG. 2 illustrates a preferred embodiment of the vacuum insulation panel with a resin rail inserted into the recess, in sectional view.

FIG. 1 shows an embodiment of a vacuum insulation panel 10 according to the invention. A support body or core 11 is completely enclosed by an envelope 20, here consisting of two sections or components 21, 22. The first component 21, larger in area, is positioned to the panel core 11, f. i. by wrapping the first component 21 from the horizontal bottom of the panel core 11 to the top area 12, which forms one of the main surfaces of the vacuum insulation panel. Thus, the first component 21 covers the top area 12 of the support body 11 only in part and in the middle region 14 a strip of the envelope 20 is recessed or remains free. Into this recess 14 the second component 22 of the envelope 20 is inserted. After the insertion of the second component 22 the overlapping ranges 23 are drawn vertically upwards, if not already preformed this way, and the inner sides 24 of the components 21, 22 are sealed.

The first component 21 of the envelope 20 is clamped in a movable sealing bar 31 (cf. FIG. 2) guided around the panel core 11. However, the wrapping of the foil-like component 21 can be made with vertical and horizontal movable folding means, as well. The formation of the second component 22 is performed by means of a forming chute (not shown) stretching the material of the second component 22, in the embodiment of the FIG. 1 a gastight high-barrier foil, by a press punch (not shown) to the panel core 11. The forming chute has the dimensions of the recess 14, into which the second component 22 is inserted. In this embodiment the panel core 11 is pressed from microporous material and thus susceptible to mechanical stress without the supporting effect of the envelope 20. The components 21, 22 are sealed or welded after complete enveloping of the support body 11. Here the press punches can also serve as press rams and backstops for the welding bar 31 (if necessary. with integrated sealing strips).

The components include a coating in the range of the sealing flaps 25a, b to improve easy sealing on the one hand and the barrier characteristics of the sealing flaps 25a, b on the other hand. Initially, the sealing flaps 25a, b resulting from welding at the overlapping ranges of the components 21, 22, b project away from the panel core 11 in vertical direction. In the subsequent process these sealing flaps 25a, b are folded to the top 12 of the finished vacuum insulation panel 10 in a flat way and bonded or welded to the envelope 20. The projections 15 of the envelope near the faces 16 of the support body 11 are then folded inwardly to the faces 16 of the support body 11 in a further process step, as known per se. By the position of the sealing flaps 25a, b only on one of the main surfaces the finished vacuum insulation panel shows convolutions only at the faces 16, whereas the longitudinal sides 17 as well as at the underside 18 have completely planar mating surfaces. Thus, accumulating of multiple vacuum insulation panels 10 along the side edges 17 and underside 18 leaving almost no cold bridges becomes possible.

FIG. 2 shows the vacuum insulation panel 10 according to the invention in sectional view. Instead of a foil section as component 22 similar to the first component 21 in material type, here a rather solid second component in form of a resin rail 26 is inserted into the recess 14 at the top 12 of the support body 11. The rail has side edges 27a, b, which are directed to the first component 21 of the envelope and include a coating 28 functional for easy sealing. After attachment of the first component 21 around the panel core 11 the portions of the first component 21 lying close to the side edges 27a, b of the rail of 26 are sealed to the rail 26. In order to maintain the insulation characteristics of the finished vacuum insulation panel 10, the rail 26 has a diffusion-dense coating at a surface 29 contacting the panel core 11.

In order to improve the fixation of the rail 26 the panel core 11 has a recess 19 in which an extension 30 of the rail 26 is inserted at the surface 29 facing the panel core. The first component 21 of the envelope 11 is clamped in sealing bars 31 and wrapped around the panel core 11 to partially envelope it to the predetermined insertion position for the rail 26. After insertion of the rail 26 the sealing bars 31 stretches from the overlapping range of the first component 21 to the rail 26 and cause a sealing of the first component 21 and the rail 26. The rail 26 includes an ORMOCER® coating in the contact area towards the first component 21 in order to function as an additional diffusion barrier in this particularly sensitive seal area. After folding the projections 15 to the faces 16 of the support body 11 the evacuation and sealing of the vacuum insulation panel 10 is completed. In order to protect the vacuum insulation panel 10 from mechanical damages, it can be processed in an automatic laminating or foaming plant directly after completion.

REFERENCE SYMBOL LIST

10=vacuum insulation panel
11=insulation/support body/panel core
12=top/main surface of the panel core
14=middle region
15=projection
16=face
17=longitudinal side
18=underside
19=recess
20=envelope
21=first component
22=second component
23=overlapping region
24=inner side
25a, b=sealing seams/flaps
26=rail
27a, b=side edge
28=sealable coating
29=surface
30=extension
31=sealing bars

The invention claimed is:

1. Vacuum insulation panel (10) comprising:
a support body (11); and
a gastight envelope (20), surrounding the support body, wherein the gas-tight envelope (20) consists of two components (21, 22), which are connected by spaced-apart sealing seams/flaps (25a, b), wherein the sealing seams/flaps (25a, b) are disposed on a main surface (12) of the vacuum insulation panel (10) and wherein one of the components (21, 22) is pre-formed as a rail (26) which has an extension (30) engaging a recess (19) in the support body (11).

2. Vacuum insulation panel (10) according to claim 1, characterized in that the components (21, 22) have a functional coating (28), disposed in proximity to the sealing seams/flaps (25a, b).

3. Vacuum insulation panel (10) according to claim 1 or 2, characterized in that the components (21, 22) consist of different materials or various material thicknesses.

4. Vacuum insulation panel (10) according to claim 1, characterized in that the gastight envelope (20) is folded towards the faces (16) of the support body (11).

* * * * *